US012586158B2

(12) United States Patent
Yahata

(10) Patent No.: US 12,586,158 B2
(45) Date of Patent: Mar. 24, 2026

(54) IMAGE SIGNAL PROCESSOR FOR A COMPOSITE CHROMINANCE IMAGE AND A COMPOSITE WHITE IMAGE

(71) Applicant: SK hynix Inc., Icheon-si (KR)

(72) Inventor: Kazuhiro Yahata, Tokyo (JP)

(73) Assignee: SK hynix Inc., Icheon-si (KR)

( * ) Notice: Subject to any disclaimer, the term of this patent is extended or adjusted under 35 U.S.C. 154(b) by 194 days.

(21) Appl. No.: 18/388,786

(22) Filed: Nov. 10, 2023

(65) Prior Publication Data

US 2025/0022101 A1 Jan. 16, 2025

(30) Foreign Application Priority Data

Jul. 14, 2023 (KR) ........................ 10-2023-0091672

(51) Int. Cl.
| | |
|---|---|
| *G06T 5/50* | (2006.01) |
| *G06T 3/40* | (2024.01) |
| *G06T 5/70* | (2024.01) |
| *G06T 7/40* | (2017.01) |
| *G06V 10/54* | (2022.01) |
| *G06V 10/56* | (2022.01) |

(52) U.S. Cl.
CPC .................. *G06T 5/50* (2013.01); *G06T 3/40* (2013.01); *G06T 5/70* (2024.01); *G06T 7/40* (2013.01); *G06V 10/54* (2022.01); *G06V 10/56* (2022.01); *G06T 2207/10024* (2013.01); *G06T 2207/20192* (2013.01); *G06T 2207/20221* (2013.01)

(58) Field of Classification Search
CPC .... G06T 5/50; G06T 3/40; G06T 5/70; G06T 7/40; G06T 2207/10024; G06T 2207/20192; G06T 2207/20221; G06T 3/4015; G06V 10/54; G06V 10/56; H04N 23/951; H04N 23/16; H04N 25/135; H04N 23/10; H04N 23/81; H04N 23/84; H04N 25/10; H04N 25/46
See application file for complete search history.

(56) References Cited

U.S. PATENT DOCUMENTS

| | | | | |
|---|---|---|---|---|
| 10,567,712 B2* | 2/2020 | Hikosaka | .............. | G06T 3/4015 |
| 11,350,047 B2* | 5/2022 | Powell | .................... | H04N 25/46 |
| 12,143,731 B1* | 11/2024 | Pawlik | .................... | H04N 23/88 |
| 2016/0205359 A1* | 7/2016 | Hirota | .................... | H04N 25/13 |
| | | | | 348/280 |
| 2016/0337623 A1* | 11/2016 | Onishi | .................... | H04N 25/48 |

FOREIGN PATENT DOCUMENTS

| | | | |
|---|---|---|---|
| JP | 2004304706 A | 10/2004 |

* cited by examiner

*Primary Examiner* — Daniel F Hajnik
*Assistant Examiner* — Thomas John Foster
(74) *Attorney, Agent, or Firm* — WILLIAM PARK AND ASSOCIATES LTD.

(57) ABSTRACT

An image signal processor includes a resolution converter configured to generate at least two images based on image data including color pixel values and white pixel values, an element processor configured to extract texture information using converted color pixel values and converted white pixel values included in each of the at least two images and to generate at least two processed images based on the extracted texture information, a synthesizer configured to generate a composite chrominance image and a composite white image by synthesizing the at least two processed images, and an image acquisition circuit configured to generate an output image based on the image data, the composite chrominance image, and the composite white image.

20 Claims, 13 Drawing Sheets in case of color moiré region pixel value linear transform
equation Assume
"chrominance(x) = aW(x)+b"
Determine (a, b) using
regression & Estimate
chrominance from W
Change in white pixel value
(By linear transform),
Determine pixel value through
conversion of chrominance change pixel position

IMAGE SIGNAL PROCESSOR FOR A COMPOSITE CHROMINANCE IMAGE AND A COMPOSITE WHITE IMAGE

CROSS-REFERENCE TO RELATED APPLICATION

This patent document claims the priority under 35 U.S.C. 119(a), and benefits of, Korean patent application No. 10-2023-0091672, filed on Jul. 14, 2023, in the Korean Intellectual Property Office, which is hereby incorporated by reference in its entirety as part of the disclosure of this patent document.

1. TECHNICAL FIELD

The technology and embodiments disclosed in this patent document generally relate to an image signal processor capable of processing image signals.

2. RELATED ART

Recently, as the number of functions of electronic devices is rapidly increasing, demand for improving an image capture function using such electronic devices is also increasing. Accordingly, technology for improving a quality of images obtained through the electronic devices is required.

An image sensor used in an imaging device has a configuration in which color filters that respectively transmit red (R) light, green (G) light, and blue (B) light of a specific wavelength band for each pixel are attached to a surface of the sensor. Although there are various types of color arrays for color filters, Bayer arrays, each of which includes three types of filters that transmit only light of specific wavelengths of red, green, and blue have been widely used.

Recently, as pixels of the image sensor are miniaturized in size, the amount of light incident upon each pixel is reduced, increasing a signal-to-noise ratio (SNR), and thus performance of the image sensor may rapidly deteriorate. In order to increase light transmittance of filters located inside the pixels and realize high-sensitivity pixels in response to the low-illuminance environment, utilization of the image sensor, which includes white (W) filters as well as other filters that transmit only light of specific wavelengths such as red, green, and blue (RGB) is rapidly increasing.

That is, a color pattern including a white channel having characteristics that is relatively robust against signal noise compared to RGB channels has been proposed. Since the white channel has been designed to receive light of a full band compared to RGB channels that receive light of specific wavelength band, signal-to-noise ratio (SNR) is relatively low even when an image is acquired in the low-illuminance environment.

However, the RGBW arrangement is a single-plate-type image sensor in which R, G, B, and W filters are arranged in a mosaic pattern. Therefore, when generating a color image, remosaic processing as color coding for generating red, green, and blue (RGB) pixel values corresponding to each pixel is required.

However, in the RGBW arrangement including white pixels, the sampling rate of R, G, and B components may be degraded compared to the RGB arrangement. As a result, false colors may occur when data for acquiring the RGBW arrangement is used in a process of generating the color image. Accordingly, the white pixels are discarded in a remosaic processing stage, and the discarded white pixels cannot be utilized in the subsequent stages.

SUMMARY

In accordance with an embodiment of the disclosed technology, an image signal processor may include a resolution converter configured to generate at least two images based on image data including color pixel values and white pixel values; an element processor configured to extract texture information using converted color pixel values and converted white pixel values included in each of the at least two images, and to generate at least two processed images based on the extracted texture information; a synthesizer configured to generate a composite chrominance image and a composite white image by synthesizing the at least two processed images; and an image acquisition circuit configured to generate an output image based on the image data, the composite chrominance image, and the composite white image.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
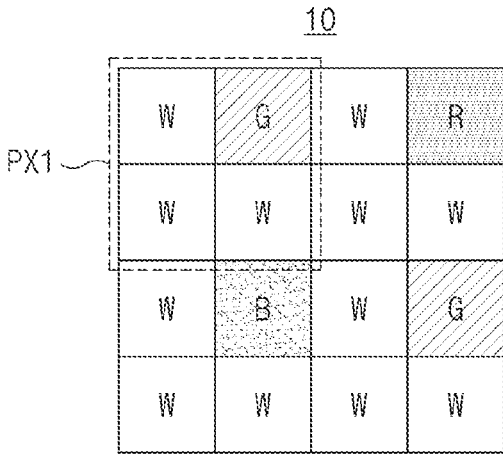
FIG. 1 is a schematic diagram illustrating examples of an RGBW arrangement based on some embodiments of the disclosed technology.
Figure 1:
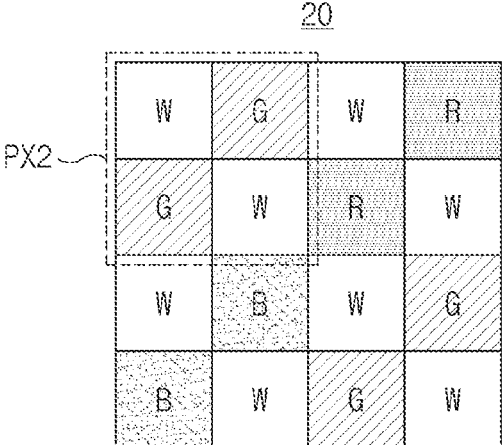
Figure 1:
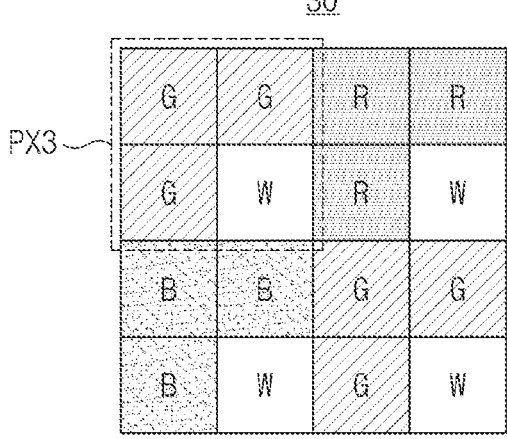

It is to be understood that both the foregoing general description and the following detailed description of the disclosed technology are illustrative and explanatory and are intended to provide further explanation of the disclosure as claimed. It will be understood that although the terms "first," "second," "third," etc. are used herein to describe various elements, these elements should not be limited by these terms. These terms are only used to distinguish one element from another element and are not intended to imply an order or number of elements. Thus, a first element in some embodiments could be termed a second element in other embodiments without departing from the teachings of the present disclosure.

This patent document provides embodiments and examples of an image signal processor for processing image signals that may be used in configurations to substantially address one or more technical or engineering issues and to mitigate limitations or disadvantages encountered in some image signal processors in the art. Some embodiments of the disclosed technology relate to an image signal processor that can improve the quality of images by utilizing white pixels from among a pattern including the white pixels in noise reduction processing or demosaicing processing. In recognition of the issues above, the image signal processor based on some embodiments of the disclosed technology can acquire an image with higher sharpness and less noise, and can thus improve the quality of image signals.

Reference will now be made in detail to some embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

Various embodiments of the disclosed technology relate to an image signal processor capable of improving the quality of images by utilizing white pixels from among a pattern including the white pixels in noise reduction processing or demosaicing processing.

An image signal processor (ISP) may perform at least one image signal process on image data to generate the processed image data. The image signal processor may reduce noise of image data, and may perform various kinds of image signal processing (e.g., demosaicing, defect pixel correction, gamma correction, color filter array interpolation, color matrix, color correction, color enhancement, lens distortion correction, etc.) for image-quality improvement of the image data.

In addition, in an embodiment, the image signal processor may compress image data that has been created by execution of image signal processing for image-quality improvement, such that the image signal processor can create an image file using the compressed image data. Alternatively, the image signal processor may recover image data from the image file. In this case, the scheme for compressing such image data may be a reversible format or an irreversible format. As a representative example of such compression format, in the case of using a still image, Joint Photographic Experts Group (JPEG) format, JPEG 2000 format, or the like can be used. In addition, in an embodiment, in the case of using moving images, a plurality of frames can be compressed according to Moving Picture Experts Group (MPEG) standards such that moving image files can be created.

The image data may be generated by an image sensing device that captures an optical image of a scene, but the scope of the disclosed technology is not limited thereto. The image sensing device may include a pixel array including a plurality of pixels configured to sense incident light received from a scene, a control circuit configured to control the pixel array, and a readout circuit configured to output digital image data by converting an analog pixel signal received from the pixel array into the digital image data. In some embodiments of the disclosed technology, it is assumed that the image data is generated by the image sensing device.

FIG. 1 is a schematic diagram illustrating examples of an RGBW arrangement based on some embodiments of the disclosed technology.

Referring to FIG. 1, 16 pixels arranged in a matrix including four rows and four columns are illustrated for convenience of description. For example, 16 pixels may be repeated in a row direction and a column direction while serving as a minimum unit of the pixel arrays (10, 20, 30), but the scope of the disclosed technology is not limited thereto.

An image sensing device based on some embodiments of the disclosed technology may include color pixels such as red (R), green (G), and blue (B) pixels and white (W) pixels. As shown in FIG. 1, the RGB color pixels and the white (W) pixels may be arranged in various forms. In some embodiments, 'R' might represent a red pixel, 'G' might represent a green pixel, 'B' might represent a blue pixel, and 'W' might represent a white pixel.

Each of the color pixels R, G, and B may be a pixel upon which light of a specific wavelength is incident by a corresponding color filter. Each of the white pixels (W) might not have a corresponding color filter, and may also be referred to as a texture pixel, a black-and-white pixel, or a monochrome pixel. For example, the color pixels R, G, and B may obtain color pixel values according to incident light of a specific color (e.g., red, green, blue, etc.) by a color filter that transmits only incident light of a specific wavelength. In contrast, the white pixels (W) may obtain a white pixel value according to incident light (e.g., visible light) that is not limited to a specific color.

The pixel array 10 may include unit pixels (PX1) each including pixels arranged in a (2×2) matrix, and each unit pixel (PX1) may include one color pixel (e.g., R, G or B) and three white pixels (W).

The pixel array 20 may include a unit pixel (PX2) each including pixels arranged in a (2×2) matrix, and each unit pixel (PX2) may include two color pixels (e.g., R, G or B) and two white pixels (W). In the pixel array 20, two color pixels included in each unit pixel (PX2) may be color pixels corresponding to the same color (i.e., G and G as shown in FIG. 1).

The pixel array 30 may include a unit pixel (PX3) each including pixels arranged in a (2×2) matrix, and each unit pixel (PX3) may include three color pixels (e.g., R, G or B) and one white pixel (W). In the pixel array 30, three color pixels included in each unit pixel (PX3) may be color pixels corresponding to the same color (i.e., G, G, and G as shown in FIG. 1).

Although FIG. 1 shows three examples, each of which includes the color pixels (R, G, B) and the white pixels (W), the scope of the disclosed technology is not limited thereto.

For example, the pixel arrays 10, 20, and 30 of the image sensor may include not only RGB pixels, but also other pixels such as magenta, yellow, cyan, and orange. For another example, the pixel arrays (10, 20, 30) may be configured such that color pixels are arranged at other possible positions (e.g., a lower-right end position) instead of upper-right end positions (or upper-left and lower-left end positions) for each unit pixel (PX1, PX2, or PX3).

For another example, the pixel arrays (10, 20, 30) may also be configured such that the unit pixels (PX1, PX2, PX3) have different numbers of white pixels (W) or white pixels (W) arranged at different positions. That is, the number of white pixels and the positions of white pixels may be different from those of the unit pixels (PX1, PX2, PX3). Accordingly, pixel arrangements of the pixel arrays (10, 20, 30) are not limited to those illustrated and may be configured in various forms to include white pixels (W) and color pixels (R, G, B).

Figure 2:
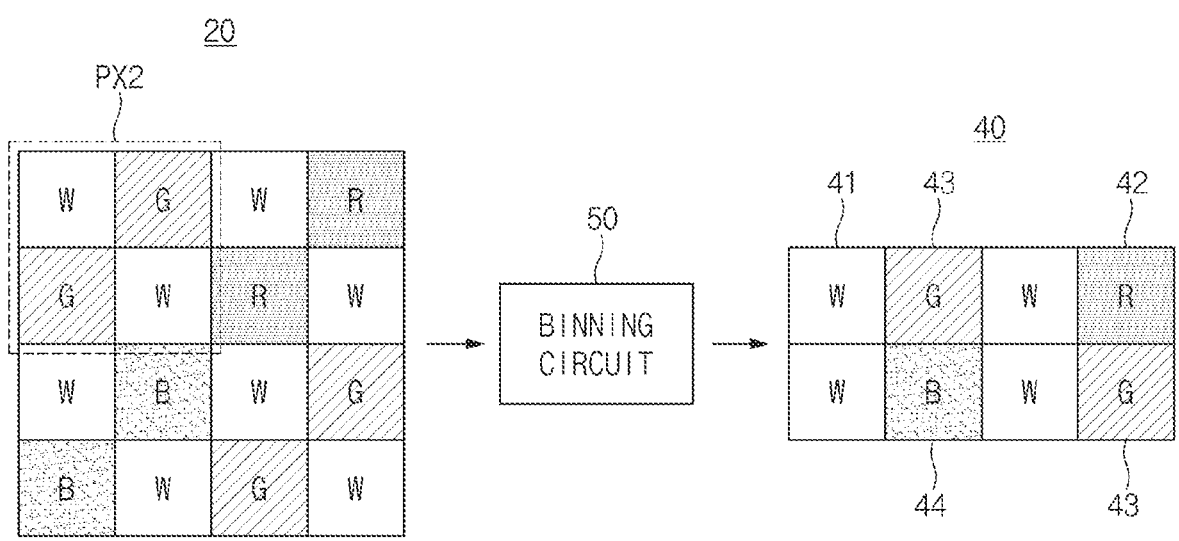
FIG. 2 is a schematic diagram illustrating an example of image data being input to an image signal processor based on some embodiments of the disclosed technology.

FIG. 2 is a schematic diagram illustrating an example of image data being input to the image signal processor based on some embodiments of the disclosed technology.

FIG. 2 illustrates an example format of image data 40 that is obtained and output by a binning circuit 50 of the image signal processor. Here, the binning circuit 50 may perform binning of the color pixels (R, G, B) and the white pixels (W). As can be seen from the embodiment of FIG. 2, the image data 40 may be generated using the pixel array 20 from among the pixel arrays (10, 20, 30). Although FIG. 2 illustrates an example in which the binning circuit 50 generates the image data 40 in a half resolution mode, the scope of the disclosed technology is not limited thereto.

The binning circuit 50 may output the image data 40 having a smaller number of pixels (e.g., a half number of pixels) than the total number of pixels of the pixel array 20. The binning circuit 50 may output one white pixel value 41 and one color pixel value (42, 43 or 44) for each unit pixel (PX2).

For example, the binning circuit 50 may output white pixel values 41 obtained by adding or averaging values obtained from two white pixels (W) included in each unit pixel (PX2). For another example, the binning circuit 50 may output a red color pixel value 42 obtained by adding or averaging values obtained from two color pixels (R) included in each unit pixel (PX2). The binning circuit 50 may output green color pixel values 43 obtained by adding or averaging values obtained from two color pixels (G) included in each unit pixel (PX2). The binning circuit 50 may output a blue color pixel value 44 obtained by adding or averaging values obtained from two color pixels (B) included in each unit pixel (PX2).

Although FIG. 2 illustrates an example in which the pixel array 20 includes the RGBW arrangement and generates image data 40 in a half resolution mode, other embodiments are also possible, and it should be noted that a format of image data that is generated by another pixel array including another arrangement can be differently determined according to a half resolution mode or a full resolution mode.

Figure 3:
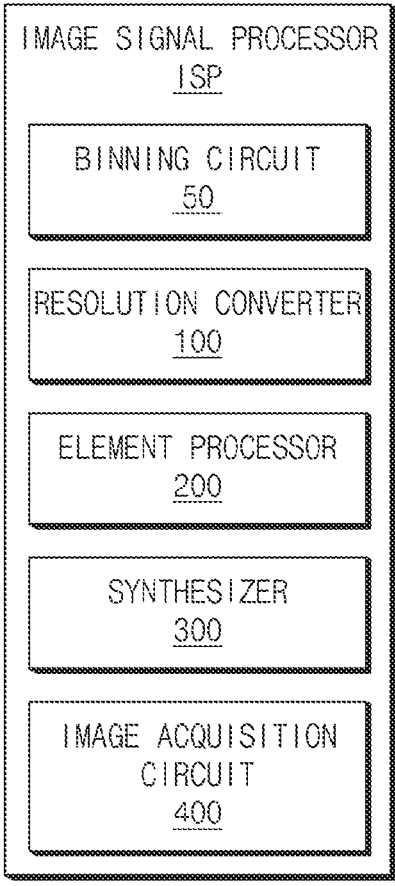
FIG. 3 is a block diagram illustrating an example of an image signal processor based on some embodiments of the disclosed technology.

FIG. 3 is a block diagram illustrating an example of the image signal processor (ISP) based on some embodiments of the disclosed technology.

Referring to FIG. 3, the image signal processor (ISP) may include a binning circuit 50, a resolution converter 100, an element processor 200, a synthesizer 300, and an image acquisition circuit 400.

The binning circuit 50 may perform binning of color pixels (R, G, B) and white pixels (W) from among image data received from the image sensor (not shown), and may thus generate image data 40 including color pixel values and white pixel values. Here, the binning circuit 50 of FIG. 3 may correspond to the binning circuit 50 of FIG. 2.

The resolution converter 100 may generate two or more images having different sizes based on the image data 40. In some embodiments, the resolution converter 100 may include a first resolution converter that acquires a first image having a smaller size than the image data 40 by converting the resolution of the image data 40. In addition, the resolution converter 100 may include a second resolution converter that acquires a second image having a smaller size than the first image by converting the resolution of the first image. For example, the first image may have a size reduced by ½ compared to the image data 40, and the second image may have a size reduced to ¼ compared to the image data 40.

The element processor 200 may extract texture information using converted color pixel values and converted white pixel values included in each of two or more images. Here, the texture may mean the shape or outline of a subject on an image. In addition, the element processor 200 may generate two or more composite images and two or more chrominance (color difference) values based on the texture information, and may perform noise reduction processing on the converted white pixel values.

In some embodiments, the element processor 200 may include a first element processor that generates a first processed image corresponding to a first image by using the first converted color pixel values and the first converted white pixel values included in the first image. In addition, the element processor 200 may include a second element processor that generates a second processed image corresponding to a second image by using the second converted color pixel values and the second converted white pixel values included in the second image.

The synthesizer 300 may generate a composite chrominance image and a composite white image by combining two or more processed images. For example, the synthesizer 300 may generate a composite chrominance image and a composite white image based on the first processed image and the second processed image.

The image acquisition circuit 400 may acquire an output image based on the composite chrominance image, the composite white image, the image processed by the element processor 200, and the white pixel value 41 included in the image data 40. The white pixel value and the chrominance value for which noise reduction processing has been completed in the element processor 200 may be synthesized by the synthesizer 300, and the synthesized resultant values may be input to the image acquisition circuit 400, so that the image acquisition circuit 400 may output an output image having less noise and more corrected chrominance as compared to the image data 40.

A detailed method of some embodiments in which the image signal processor (ISP) reduces noise included in the image data and interpolates a chrominance (color difference) using the resolution converter 100, the element processor 200, the synthesizer 300, and the image acquisition circuit 400 will be described later with reference to the flowchart of FIG. 4 and examples of FIGS. 5 to 12B.

Figure 4:
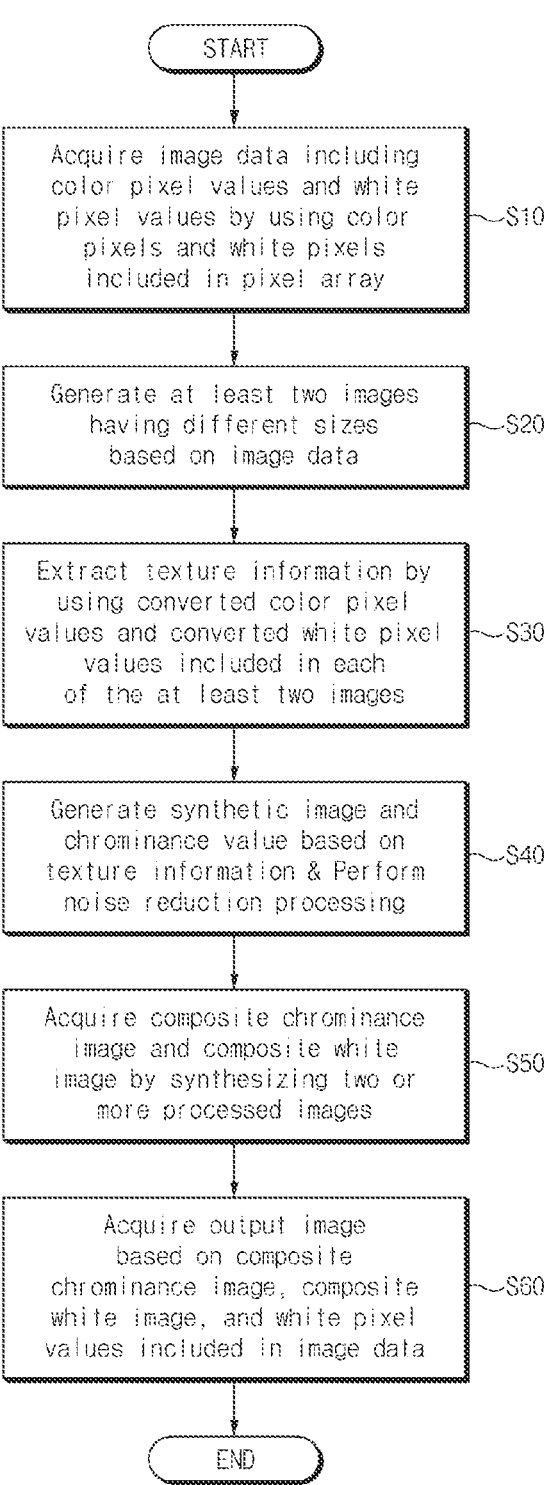
FIG. 4 is a flowchart illustrating an example of a method for reducing noise included in image data and interpolating a color difference (chrominance) of the image data according to the embodiment of FIG. 3.

FIG. 4 is a flowchart illustrating an example of a method for reducing noise included in image data and interpolating a color difference (chrominance) of the image data according to the embodiment of FIG. 3.

In operation S10, the binning circuit 50 may generate image data (e.g., 40 of FIG. 2) including color pixel values (e.g., 42~44 of FIG. 2) and white pixel values (e.g., 41 of FIG. 2) by using color pixels (e.g., RGB pixels) and white pixels (W) of the pixel array 20. As used herein, the tilde "~" indicates a range of components. For example, "42~44" indicates the color pixel values 42, 43, and 44 shown in FIG. 2.

In operation S20, the image signal processor ISP (e.g., the resolution converter 100) may generate two or more images having different sizes based on the image data (e.g., 40). The resolution converter 100 may acquire a plurality of images by reducing the resolution of image data. As the resolution of image data is converted by the resolution converter 100, each of two or more images may include converted color pixel values and converted white pixel values.

In operation S30, the image signal processor ISP (e.g., the element processor 200) may extract texture information using converted color pixel values and converted white pixel values included in each of two or more images.

In operation S40, the image signal processor ISP (e.g., the element processor 200) may generate an image for synthesis based on the extracted texture information, may calculate a chrominance (color difference) value, and may perform noise reduction processing on the converted white pixel values. Accordingly, the element processor 200 may generate two or more processed images respectively corresponding to the two or more images.

In operation S50, the image signal processor ISP (e.g., the synthesizer 300) may synthesize two or more processed images to acquire a composite chrominance image and a composite white image.

The synthesizer 300 may generate a first processed image for a partial region (e.g., an image region having edges or thin lines) having a texture higher than a certain level, and may generate a composite chrominance image and a composite white image for another partial region (e.g., a flat image region or a gradation image region) based on a second processed image. For example, the synthesizer 300 may generate a composite chrominance image and a composite white image by performing multi-scale processing on two or more processed images. Here, the expression "multi-scale processing" may refer to an operation for selecting/processing a low-resolution processed image (i.e., the second processed image) in a flat image region having no texture based on multiple processed images having different sizes, and may also refer to an operation for selecting/processing a high-resolution processed image (i.e., the first processed image) in a textured image region.

In operation S60, the image signal processor ISP (e.g., the image acquisition circuit 400) may acquire an output image based on the composite chrominance image, the composite white image, and the white pixel values (e.g., 41 of FIG. 2). For example, the image acquisition circuit 400 may interpolate a chrominance signal based on the composite chrominance image, the composite white image, and the white pixel values. In addition, in an embodiment, the image acquisition circuit 400 may generate an edge enhancement signal based on the composite chrominance image, the composite white image, and the white pixel values, and may thus increase the sharpness of excessively blurred image regions.

In an embodiment, the image signal processor (ISP) may acquire an output image that is not excessively blurred with less noise by using a white pixel value together with a composite image that was obtained based on images having different sizes. Unlike the disclosed technology, when multi-scale processing is performed on images (e.g., color images) that do not use white pixel values, a specific region of the composite image may be excessively blurred. For example, multi-scale processing of images may refer to an operation for selecting a non-reduced image in a region having textures (hereinafter referred to as a textured region), selecting a reduced image (or a simply enlarged image with a low resolution) in a region having no texture, and synthesizing the non-reduced image and the reduced image. However, when noise is included in the image, it is determined that the image has no texture even though the image actually has textures, so that the reduced image can be selected and synthesized. That is, when noise is included in the image, it is difficult to determine whether or not the image has a texture due to occurrence of such noise, so there are some cases in which excessive blurring is performed even in a textured region.

However, according to an embodiment of the disclosed technology, the image signal processor (ISP) may generate an edge enhancement signal based on an original white pixel value from which noise is not reduced. Accordingly, in an embodiment, the degree of blurring included in the output image may be minimized by restoring an excessively blurred region (or an unnecessarily blurred region) from the composite image.

Hereinafter, a specific example in which constituent elements included in the image signal processor (ISP) generate the output image will be described in detail.

Figure 5:
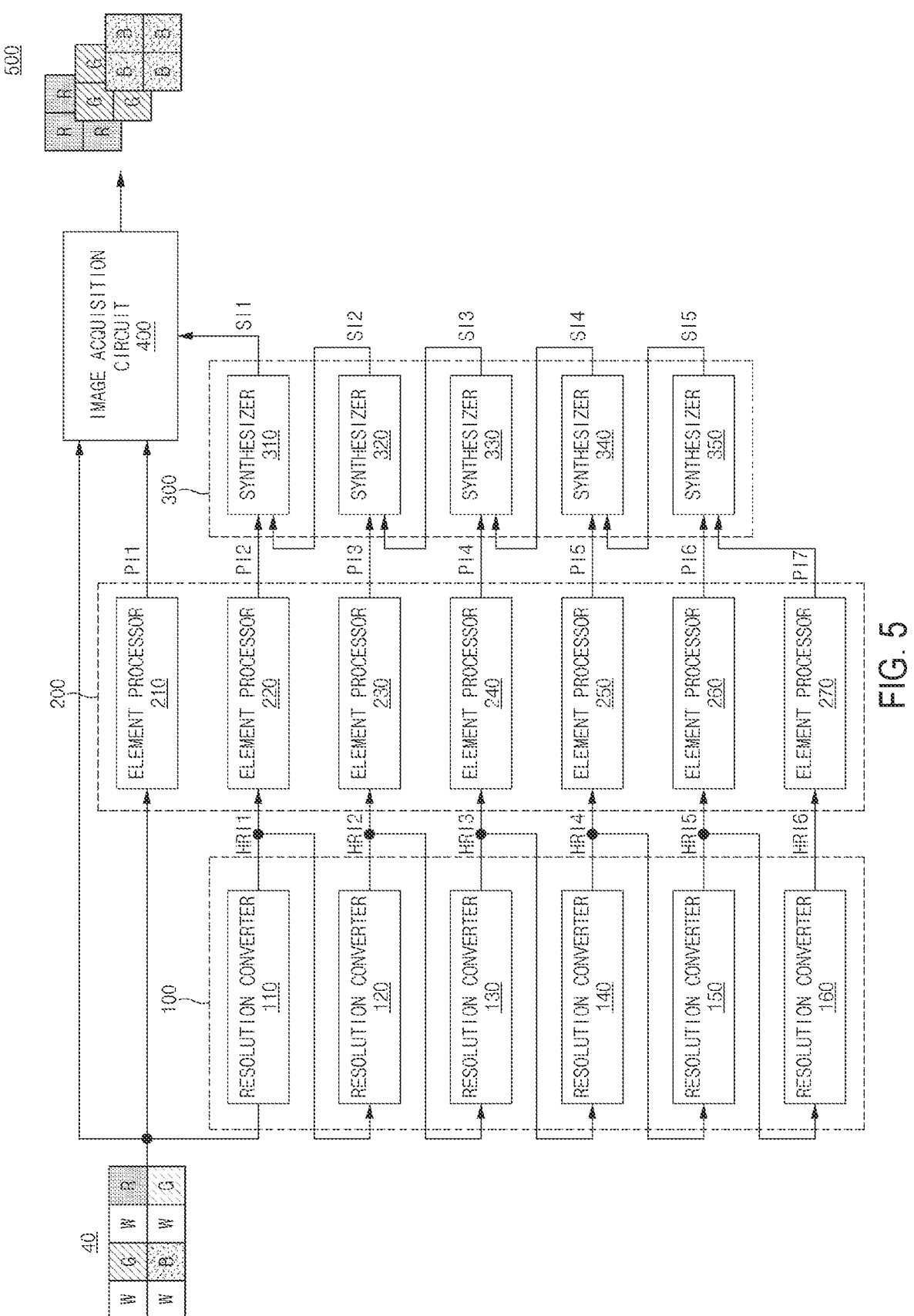
FIG. 5 is a schematic diagram illustrating an example of a detailed configuration of the image signal processor shown in FIG. 3 based on some embodiments of the disclosed technology.

FIG. 5 is a schematic diagram illustrating an example of a detailed configuration of the image signal processor (ISP) shown in FIG. 3 based on some embodiments of the disclosed technology.

Referring to FIG. 5, the image signal processor (ISP) may receive binned image data 40 through the binning circuit 50. Here, the image data 40 may correspond to the image data 40 shown in FIG. 2.

The image signal processor (ISP) may convert the resolution of the image data 40 through the resolution converter 110, and may thus generate a first image (HRI1) having a smaller size than the image data 40. Here, the first image (HRI1) may include R, G, B, and W pixel values each having a smaller size than the image data 40. For example, the first image (HRI1) may have a size corresponding to half the size of the image data 40.

The image signal processor (ISP) may convert the resolution of the first image (HRI1) through the resolution converter 120 to generate a second image (HRI2) having a smaller size than the first image (HRI1). The second image (HRI2) may include R, G, B, and W pixel values each having a smaller size than the first image (HRI1). For example, the second image (HRI2) may have a size corresponding to ¼ of the size of the image data 40.

Similarly, the image signal processor (ISP) may acquire a third image (HRI3) having a smaller size than the second image (HRI2) through the resolution converter 130, may acquire a fourth image (HRI4) having a smaller size than the third image (HRI3) through the resolution converter 140, may acquire a fifth image (HRI5) having a smaller size than the fourth image (HRI4) through the resolution converter 150, and may acquire a sixth image (HRI6) having a smaller size than the fifth image (HRI5) through the resolution converter 160. The third image (HRI3) may have a size corresponding to ⅛ of the size of the image data 40, the fourth image (HRI4) may have a size corresponding to 1/16 of the size of the image data 40, the fifth image (HR15) may have a size corresponding to 1/32 of the size of the image data 40, and the sixth image (HRI6) may have a size corresponding to 1/64 of the size of the image data 40.

The image signal processor (ISP) may generate the processed image (PI1) using the color pixel values and the white pixel values included in the image data 40 through the element processor 210. Here, the element processor 210 may extract texture information based on the color pixel values and the white pixel values included in the image data 40, and may thus output an image for synthesis (i.e., a synthetic image). Also, the element processor 210 may perform noise reduction on white pixel values based on the extracted texture information. Also, the element processor 210 may calculate a chrominance (color difference) value between color pixel values and white pixel values based on the extracted texture information. An image set, which includes a composite image being output from the element processor 210, a white image processed for noise reduction, and chrominance values, may be understood as a processed image (PI1). For example, the processed image (PI1) may have the same size as the image data 40.

The image signal processor (ISP) may generate the processed image (PI2) using the converted color pixel values and the converted white pixel values included in the first image (HRI1) through the element processor 220. The element processor 220 may extract texture information based on the converted color pixel values and the converted white pixel values included in the first image (HRI1), and may thus output an image for synthesis (i.e., a composite image). Also, the element processor 220 may perform noise reduction on white pixel values based on the extracted texture information. Also, the element processor 220 may calculate a chrominance (color difference) value between color pixel values and white pixel values based on the extracted texture information. An image set, which includes a composite image being output from the element processor 220, a white image processed for noise reduction, and chrominance values, may be understood as a processed image (PI2). For example, the processed image (PI2) may have a size corresponding to half the size of the image data 40.

The image signal processor (ISP) may generate the processed image (PI3) using the converted color pixel values and the converted white pixel values included in the second image (HRI2) through the element processor 230. The element processor 230 may extract texture information based on the converted color pixel values and the converted white pixel values included in the second image (HRI2), and may thus output an image for synthesis (i.e., a composite image). Also, the element processor 230 may perform noise reduction on white pixel values based on the extracted texture information. Also, the element processor 230 may calculate a chrominance (color difference) value between color pixel values and white pixel values based on the extracted texture information. An image set, which includes a composite image being output from the element processor 230, a white image processed for noise reduction, and chrominance values, may be understood as a processed image (PI3). For example, the processed image (PI3) may have a size corresponding to ¼ of the size of the image data 40.

Likewise, the image signal processor (ISP) may generate a processed image (PI4) corresponding to the third image (HRI3) through the element processor 240, may generate a processed image (PI5) corresponding to the fourth image (HRI4) through the element processor 250, may generate a processed image (PI6) corresponding to the fifth image (HRI5) through the element processor 260, and may generate a processed image (PI7) corresponding to the sixth image (HRI6) through the element processor 270. Here, the processed image (PI4) may have a size corresponding to ⅛ of the size of the image data 40, the processed image (PI5) may have a size corresponding to ¹⁄₁₆ of the size of the image data

40, the processed image (PI6) may have a size corresponding to ¹⁄₃₂ of the size of the image data 40, and the processed image (PI7) may have a size corresponding to ¹⁄₆₄ of the size of the image data 40.

The image signal processor (ISP) may synthesize a processed image (PI2) and a composite image (SI2) through the synthesizer 310, and may thus generate a composite image (SI1). Here, an image set, which includes a composite chrominance image and a composite white image which are output from the synthesizer 310, may be understood as the composite image (SI1). The composite image (SI1) may have a size corresponding to half the size of the image data 40.

The image signal processor (ISP) may synthesize a processed image (PI3) and a composite image (SI3) through the synthesizer 320, and may thus generate a composite image (SI2). Here, an image set, which includes a composite chrominance image and a composite white image which are output from the synthesizer 320, may be understood as composite image (SI2). The composite image (SI2) may have a size corresponding to ¼ of the size of the image data 40.

Likewise, the image signal processor (ISP) may generate a composite image (SI3) by synthesizing a processed image (P14) and a composite image (SI4) through the synthesizer 330, may generate a composite image (SI4) by synthesizing a processed image (PI5) and a composite image (SI5) through the synthesizer 340, and may generate a composite image (SI5) by synthesizing a processed image (P16) and a processed image (PI7) through the synthesizer 350. Here, the composite image (SI3) may have a size corresponding to ⅛ of the size of the image data 40, the composite image (SI4) may have a size corresponding to ¹⁄₁₆ of the size of the image data 40, and the composite image (SI5) may have a size corresponding to ¹⁄₃₂ of the size of the image data 40.

The image signal processor (ISP) may generate an RGB image through the image acquisition circuit 400 using the white pixel value 41 included in the image data 40, the processed image (P11), and the composite image (SI1). The image signal processor (ISP) may acquire an output image 500 by converting an RGBW image into an RGB image through the image acquisition circuit 400.

Although FIG. 5 illustrates that the image signal processor (ISP) includes six resolution converters (110~160), seven element processors (210~270), and five synthesizers (310~350) for convenience of description, other embodiments are also possible.

The above constituent elements shown in FIG. 5 will hereinafter be described in detail with reference to FIGS. 6 to 12B.

Figure 6:
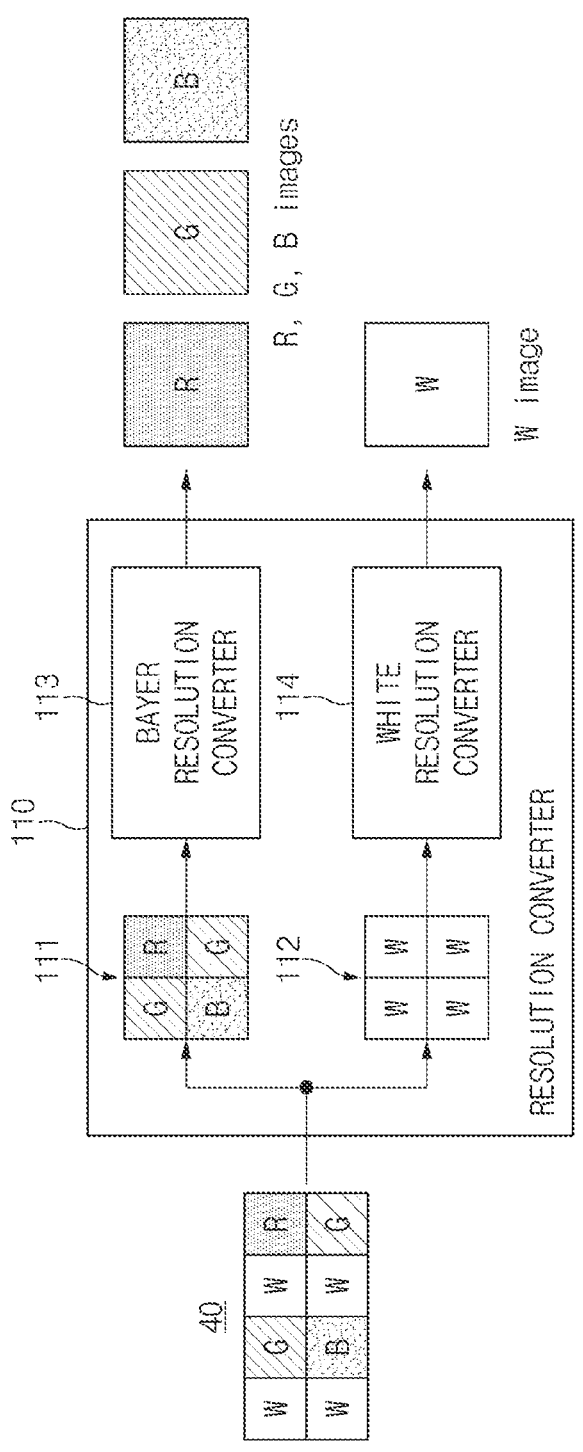
FIGS. 6 and 7 are schematic diagrams illustrating examples of a detailed configuration and operation of a resolution converter shown in FIG. 5 based on some embodiments of the disclosed technology.

FIG. 6 is a schematic diagram illustrating an example of a detailed configuration and operation of the resolution converter 110 shown in FIG. 5 based on some embodiments of the disclosed technology.

Referring to FIG. 6, the resolution converter 110 may include a Bayer resolution converter 113 and a white resolution converter 114.

The Bayer resolution converter 113 may convert the resolution of a Bayer image 111 of the image data 40 to output color images (R, G, and B images) each having a smaller size than the image data 40. For example, each of the R, G, and B images (corresponding to the first image HRI1) being output from the Bayer resolution converter 113 may have a size corresponding to half the size of the Bayer image 111. For example, "half size" may mean reducing the number of pixels by half, thus reducing the data storage capacity by half.

The white resolution converter 114 may convert the resolution of the white image 112 of the image data 40 to output a white image having a smaller size than the image data 40. For example, the white image being output from the white resolution converter 114 may have a size corresponding to half the size of the image data 40.

Here, the positions of the Bayer image 111 and the white image 112 of the image data 40 being input to the resolution converter 110 may be misaligned. Accordingly, the Bayer resolution converter 113 may perform interpolation such that the position of the center pixel of the reduced (scaled-down) white image coincides with the center of gravity of the center pixel of each of the reduced (scaled-down) R, G, and B images. That is, in order to prevent or mitigate a bokeh phenomenon from occurring in the white image 112 that is used to obtain texture information when down-scaling the Bayer image 111 and the white image 112, the Bayer resolution converter 113 may calculate an interpolation coefficient of each of the R, G, and B pixels based on the white image 112. For example, the Bayer resolution converter 113 may perform interpolation using a variety of interpolation methods such as bilateral interpolation, bicubic interpolation, bilinear interpolation, etc. so that the center of gravity of the R, G, and B images coincides with the center of gravity of the white image. Here, the method for interpolating the R, G, and B images to match the center of gravity is not limited thereto.

Figure 7:
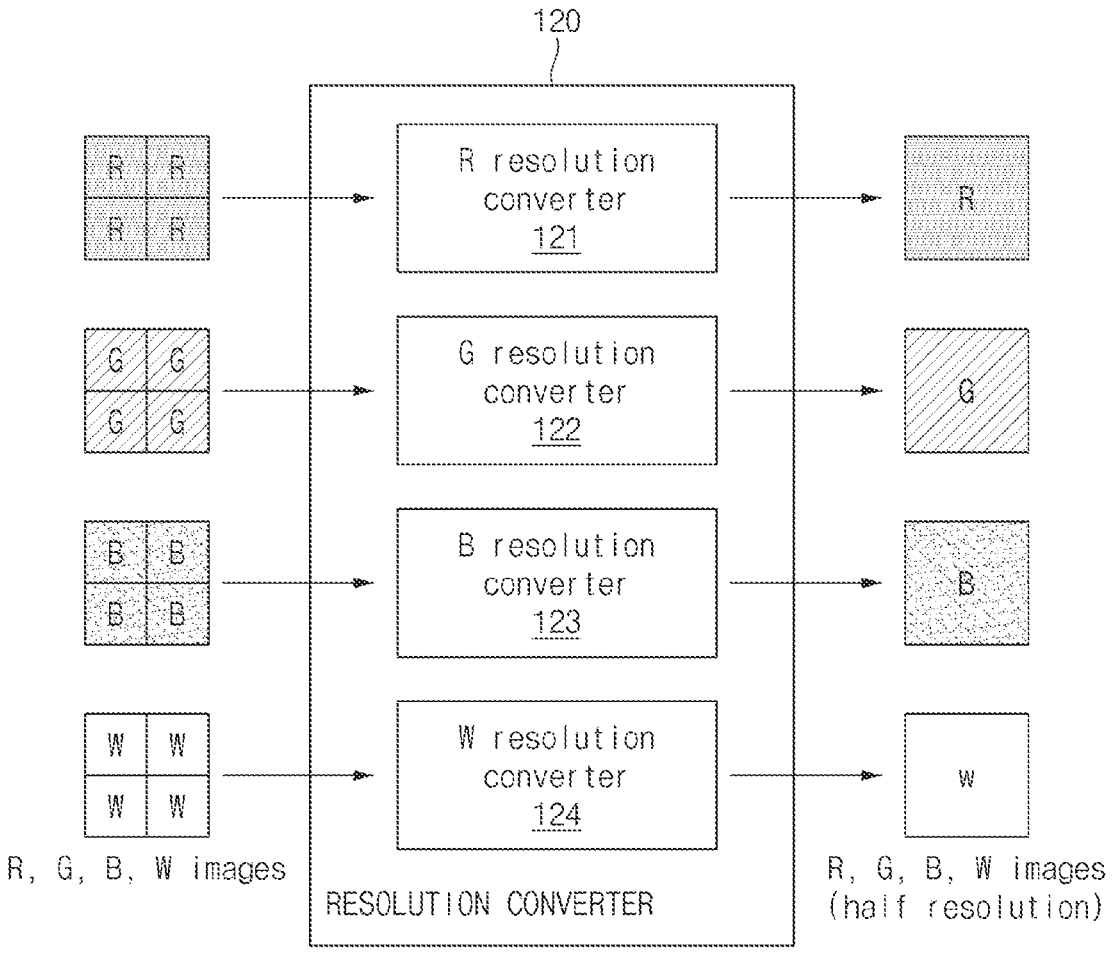

FIG. 7 is a schematic diagram illustrating an example of a detailed configuration of the resolution converter 120 shown in FIG. 5 based on some embodiments of the disclosed technology.

Referring to FIG. 7, the resolution converter 120 may include a red (R) resolution converter 121, a green (G) resolution converter 122, a blue (B) resolution converter 123, and a white (W) resolution converter 124.

Here, the red resolution converter 121 may convert the resolution of the first image (HRI1) (i.e., the resolution of the red image) of the resolution converter 110 to output a red image having a smaller size than the image data 40. For example, the red resolution converter 121 may average pixel values obtained from four red pixels (R) to output a red image having a smaller size (i.e., a reduced size).

The green resolution converter 122 may convert the resolution of the first image (HRI1) (i.e., the resolution of the green image) of the resolution converter 110 to output a green image having a smaller size than the image data 40. For example, the green resolution converter 122 may average pixel values obtained from four green pixels (G) to output a green image having a smaller size (i.e., a reduced size).

The blue resolution converter 123 may convert the resolution of the first image (HRI1) (i.e., the resolution of the blue image) of the resolution converter 110 to output a blue image having a smaller size than the image data 40. For example, the blue resolution converter 123 may average pixel values obtained from four blue pixels (B) to output a blue image having a smaller size (i.e., a reduced size).

The white resolution converter 124 may convert the resolution of the first image (HRI1) (i.e., the resolution of the white image) of the resolution converter 110 to output a white image having a smaller size than the image data 40. For example, the white resolution converter 124 may average pixel values obtained from four white pixels (W) to output a white image having a smaller size (i.e., a reduced size).

For example, the R, G, B, and W images (i.e., the second image HRI2) being output from the resolution converter 120 may have a size corresponding to half the size of the input image (i.e., the first image HRI1).

The remaining resolution converters (130~160) have the same configuration as the resolution converter 120 except for the sizes of the input/output (I/O) images compared to the resolution converter 120, as such redundant descriptions of detailed configurations and operations of the resolution converters (130~160) will herein be omitted for brevity.

Figure 8:
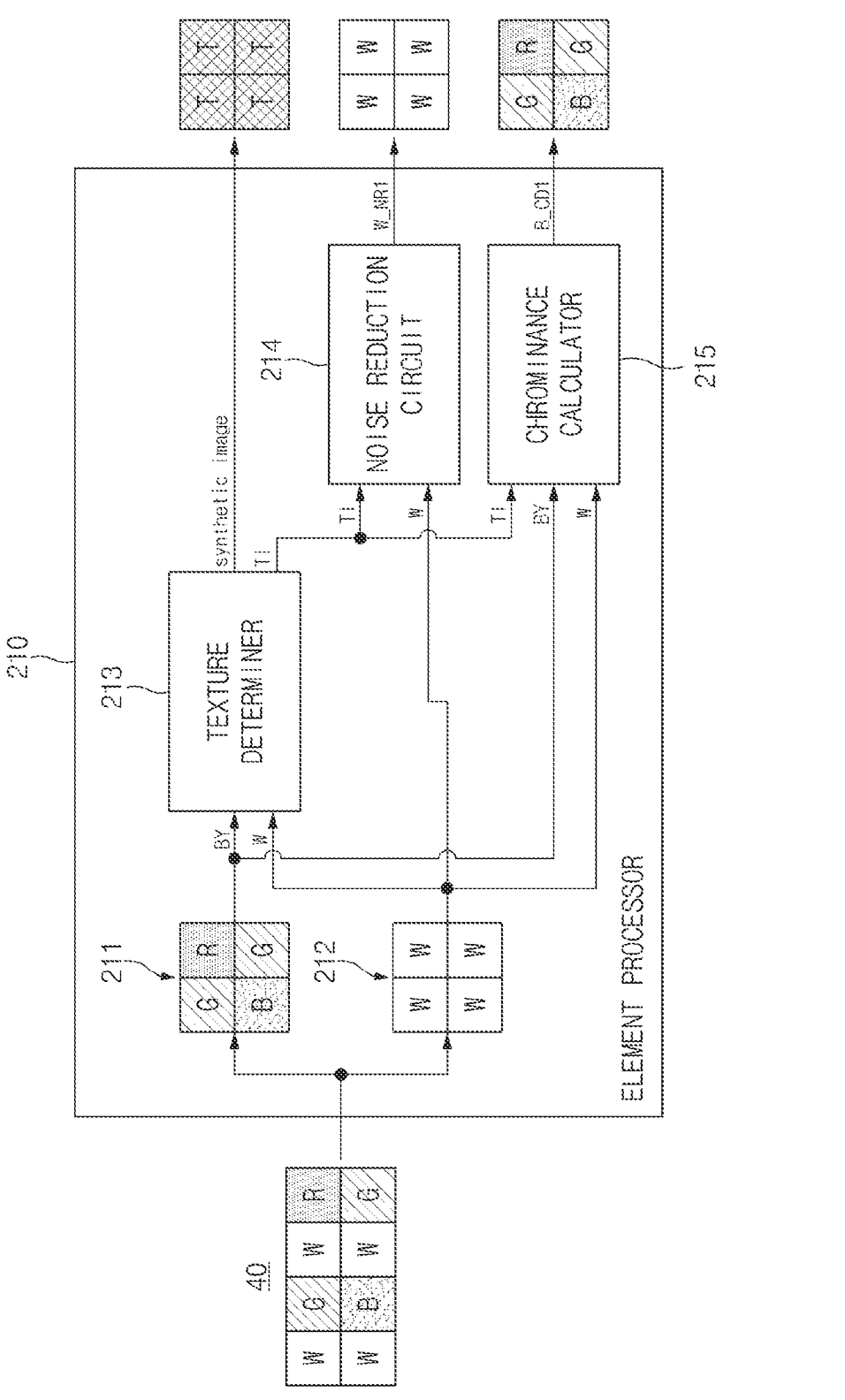
FIGS. 8 and 9 are schematic diagrams illustrating examples of a detailed structure of an element processor shown in FIG. 5 based on some embodiments of the disclosed technology.

FIG. 8 is a schematic diagram illustrating an example of a detailed configuration of the element processor 210 shown in FIG. 5.

Referring to FIG. 8, the element processor 210 may include a texture determiner 213, a noise reduction circuit 214, and a chrominance (color difference) calculator 215.

The texture determiner 213 may determine a texture based on the Bayer image 211 and the white image 212 of the image data 40, and may thus generate texture information (TI) and an image (T) for synthesis. The Bayer image 211 and the white image 212 input to the texture determiner 213 shown in FIG. 8 may be identical to the Bayer image 111 and the white image 112 shown in FIG. 6, respectively.

Here, the texture information (TI) may include information on whether the Bayer image (BY) 211 and the white image 212 belong to a flat image region or a gradation image region, information on whether an edge or thin line exists, and information about a direction of a thin line when the thin line exists. For example, the texture determiner 213 may preferentially determine the texture information (TI) of the white image (W) 212. For example, the texture determiner 213 may first determine the texture information (TI) in the white image 212. When there is no texture information in the white image 212, the texture determiner 213 may determine the texture information (TI) in the Bayer image 211.

In addition, when multi-scale processing is performed in the image acquisition circuit 400 shown in FIGS. 4 and 5, the ratio of two images to be synthesized with each other may be adjusted based on the texture information (TI). Accordingly, the texture determiner 213 may convert texture information (TI) into a synthetic image (T) for the synthetic operation of the image acquisition circuit 400, and may provide the image acquisition circuit 400 with the synthetic image (T).

Here, the synthetic image (T) may be an image used when two images having different resolutions are synthesized with each other. For example, two images may be synthesized using the alpha($\alpha$) blend method. For example, interpolation processing may be performed on a low-resolution image using linear interpolation, and an output image having a resolution matched to a high-resolution image may be generated. Although two images are synthesized using the alpha($\alpha$) blend method, the scope of the disclosed technology is not limited thereto, and various methods for synthesizing such two images may be used. The synthetic image (T) may be defined as an image (or an image value) obtained when data representing the amplitude or synthesis ratio of the texture is calculated for each pixel. For example, the synthetic image (T) may be used when two images are synthesized by increasing the ratio of a high-resolution image in a boundary region having edges or textures, or may be used when two images are synthesized by increasing the ratio of a low-resolution image in a flat region having no edges or no textures.

The noise reduction circuit 214 may perform noise reduction processing on pixel values of the white image 212 based on the texture information (TI), and may generate a noise-reduced white image (W_NR1). The noise reduction circuit 214 may perform different noise reduction processes not only in some regions in which the texture is greater than or equal to a certain level based on the texture information (TI), but also in other regions in which the texture is less than a certain level based on the texture information (TI).

For example, the noise reduction circuit 214 may perform noise reduction by averaging weights of neighboring pixels located around a target pixel (i.e., a central pixel located at the center of an input image unit) in the direction of the texture (e.g., the direction of edges or thin lines) in some regions (e.g., an image region having edges or thin lines) in which the texture is equal to or higher than a certain level based on texture information (TI). In addition, the noise reduction circuit 214 may perform noise reduction by averaging pixel values of neighboring pixels located around the target pixel in some regions (e.g., a flat image region or a gradation image region) in which the texture is less than a certain level based on the texture information (TI).

Also, the chrominance calculator 215 may calculate a chrominance value (B_CD1) between the Bayer image 211 and the white image 212 based on the texture information (TI).

For example, the chrominance calculator 215 may calculate a chrominance value in the direction of the texture (i.e., the direction of edges or thin lines) in some regions in which the texture is equal to or higher than a certain level based on the texture information TI. In addition, the chrominance calculator 215 may calculates a chrominance (color difference) value using neighboring pixels located around the target pixel in other regions (e.g., a flat image region or a gradation image region) in which the texture is less than a certain level based on texture information (TI).

The synthetic image (T), the noise-reduced white image (W_NR1), and the chrominance (color difference) value (B_CD1) generated by the element processor 210 may be transmitted to the image acquisition circuit 400 as the processed image (PI1).

Figure 9:
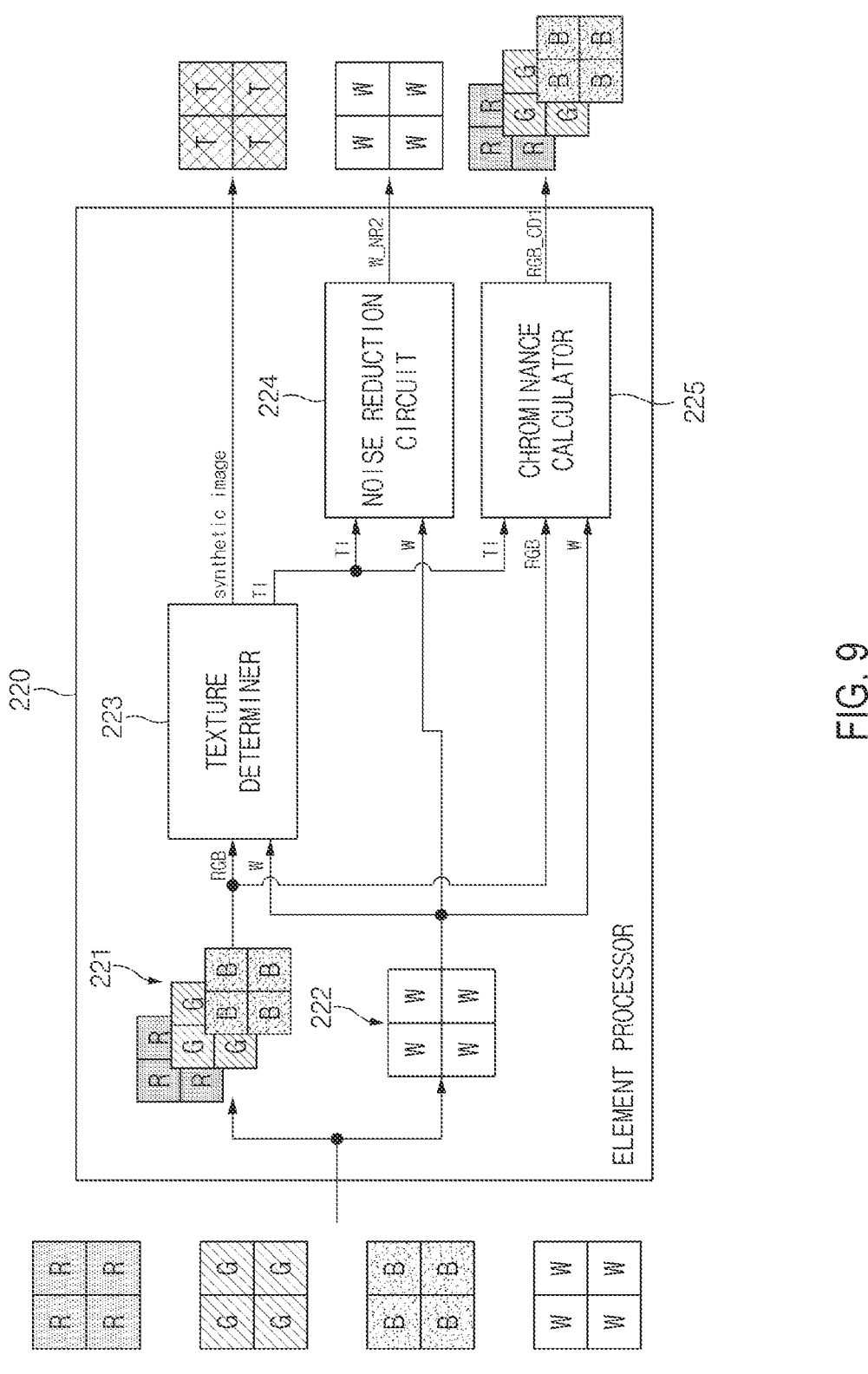

FIG. 9 is a schematic diagram illustrating an example of a detailed configuration of the element processor 220 shown in FIG. 5.

Referring to FIG. 9, the element processor 220 may include a texture determiner 223, a noise reduction circuit 224, and a chrominance calculator 225.

Here, the texture determiner 223 may determine the texture based on the first image (HRI1) 221 (i.e., a red image, a green image, and a blue image, RGB) and the white image (W) 222 of the resolution converter 110, and may generate the synthetic image (T) and the texture information (TI).

When the operation of synthesizing two input images is performed by the synthesizer 310 shown in FIGS. 4 and 5, the ratio of the composite images may be adjusted based on the texture information (TI). Accordingly, the texture determiner 223 may convert the texture information (TI) into the synthetic image (T) for the synthesis operation of the synthesizer 310, and may provide the synthesizer 310 with the synthetic image (T).

In addition, the noise reduction circuit 224 may perform noise reduction processing on pixel values of the white image 222 based on the texture information (TI), and may generate a noise-reduced white image (W_NR2). The noise reduction circuit 224 may perform different noise reduction processes not only in some regions in which the texture is equal to or higher than a certain level, but also in other regions in which the texture is less than a certain level, based on the texture information (TI).

For example, the noise reduction circuit 224 may perform noise reduction by averaging weights of neighboring pixels located around a target pixel in the direction of the texture (i.e., the direction of edges or thin lines) in some regions (e.g., an image region in which edges or thin lines exist) in which the texture is equal to or higher than a certain level based on the texture information (TI). In addition, the noise reduction circuit 224 may perform noise reduction by averaging pixel values of neighboring pixels located around the target pixel in other regions (e.g., a flat image region or a gradation image region) in which the texture is less than a certain level based on the texture information (TI).

Also, the chrominance calculator 225 may calculate a chrominance value (RGB_CD1) between the RGB image and the white image 222 based on the texture information (TI).

For example, the chrominance calculator 225 may calculate a chrominance value in the direction of the texture (i.e., the direction of edges or thin lines) in some regions (e.g., an image region having edges or thin lines) in which the texture is equal to or higher than a certain level based on the texture information (TI). In addition, the chrominance calculator 225 may calculate a chrominance value using neighboring pixels located around the target pixel in some regions (e.g., a flat image region or a gradation image region) in which the texture is less than a certain level based on the texture information (TI). For example, the chrominance value may be calculated by dividing the average of red R pixels (or green G pixels or blue B pixels) into the average of white W pixels.

The synthetic image (T), the noise-reduced white image (W_NR2), and the chrominance value (RGB_CD1) generated by the element processor 220 may be transmitted to the synthesizer 310 as the processed image (PI2).

The remaining element processors (230~270) have the same configuration as the element processor 220 except for the sizes of the input/output (I/O) images compared to the element processor 220, as such redundant descriptions of detailed configurations and operations of the element processors (230~270) will herein be omitted for brevity.

Figure 10:
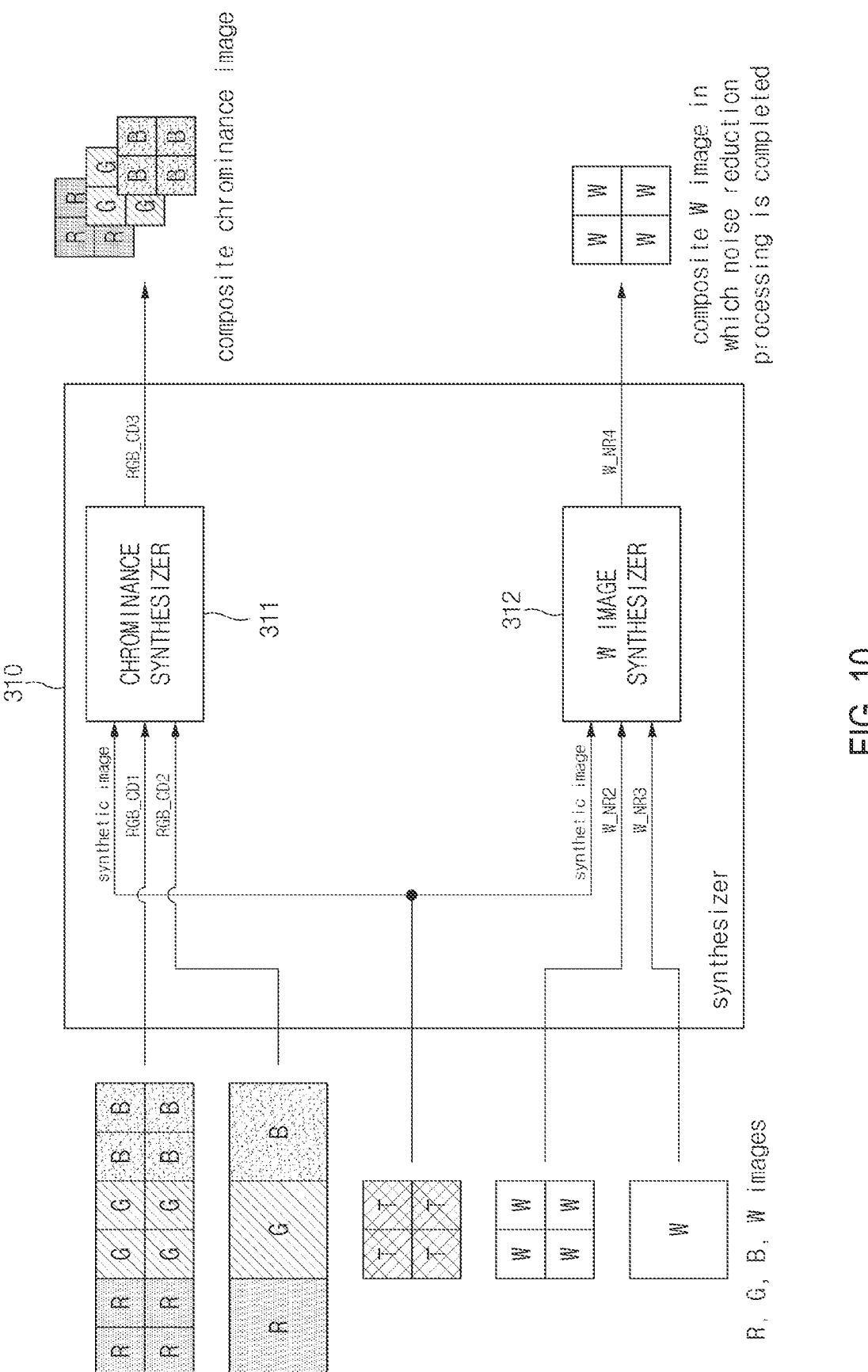
FIG. 10 is a schematic diagram illustrating an example of a detailed configuration of a synthesizer shown in FIG. 5 based on some embodiments of the disclosed technology.

FIG. 10 is a schematic diagram illustrating an example of a detailed configuration of the synthesizer 310 shown in FIG. 5 based on some embodiments of the disclosed technology.

Referring to FIG. 10, the synthesizer 310 may include a chrominance synthesizer 311 and a white (W) image synthesizer 312.

The chrominance synthesizer 311 may synthesize a chrominance value (RGB_CD1) and a chrominance value (RGB_CD2) based on the synthetic image (T) received from the element processor 220, and may thus generate a composite chrominance image (RGB_CD3). Here, the chrominance value (RGB_CD1) may refer to a chrominance (color difference) value for the RGB images (corresponding to the processed image PI2) received from the element processor 220. Also, the chrominance value (RGB_CD2) may refer to a chrominance value for the low-resolution RGB images (corresponding to the composite image SI2) received from the synthesizer 320.

The chrominance synthesizer 312 may synthesize a white image (W_NR2) and a white image (W_NR3) based on the synthetic image (T) received from the element processor 220, and may thus generate a composite white image (W_NR4). Here, the white image (W_NR2) may refer to a low-noise white image (corresponding to the processed image PI2) received from the element processor 220. Also, the white image (W_NR3) may refer to a low-resolution white image (corresponding to the composite image SI2) received from the synthesizer 320.

For example, the chrominance synthesizer 311 and the white image synthesizer 312 may increase the ratio of a reduced image (e.g., a composite image SI2) in a flat image region or a gradation image region based on the image (T) for synthesis, may increase the ratio of a non-reduced input image (e.g., the processed image PI2) in an image region having edges or thin lines, and may thus synthesize the two input images. Accordingly, sharpness may be maintained in a region in which the texture equal to or higher than a certain level, and noise may be reduced in another region in which the texture is less than a certain level.

The remaining synthesizers (320~350) have the same configuration as the synthesizer 310 except for the sizes of the input/output (I/O) images compared to the synthesizer 310, as such redundant descriptions of detailed configurations and operations of the synthesizers (300~350) will herein be omitted for brevity.

Figure 11:
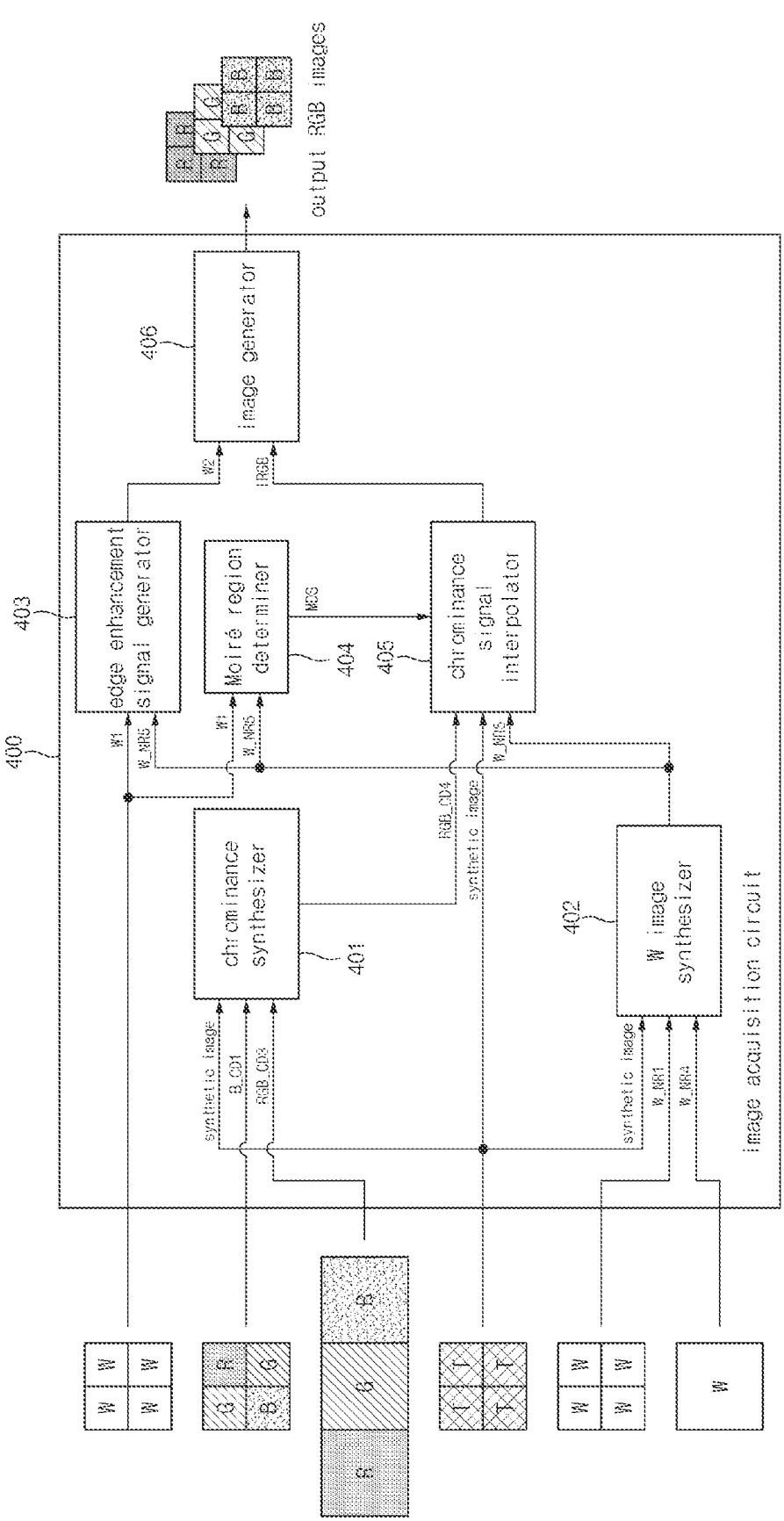
FIG. 11 is a schematic diagram illustrating an example of an image acquisition circuit shown in FIG. 5 based on some embodiments of the disclosed technology.
Figure 12A:
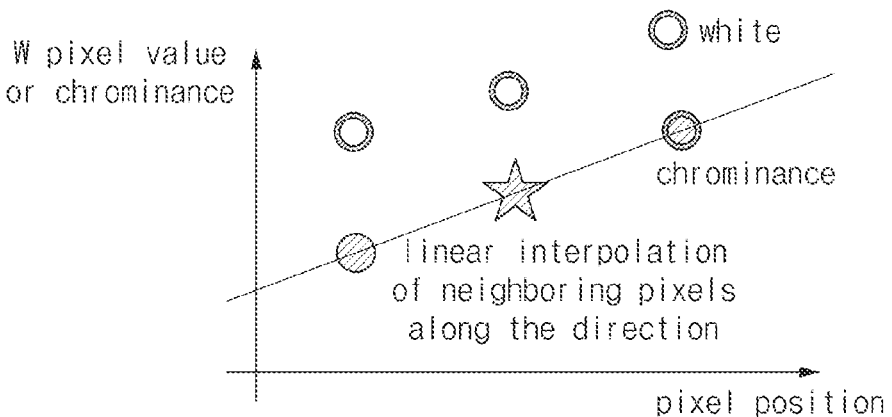
FIGS. 12A and 12B are graphs illustrating examples of operations of a chrominance signal interpolator shown in FIG. 11 based on some embodiments of the disclosed technology.
Figure 12B:
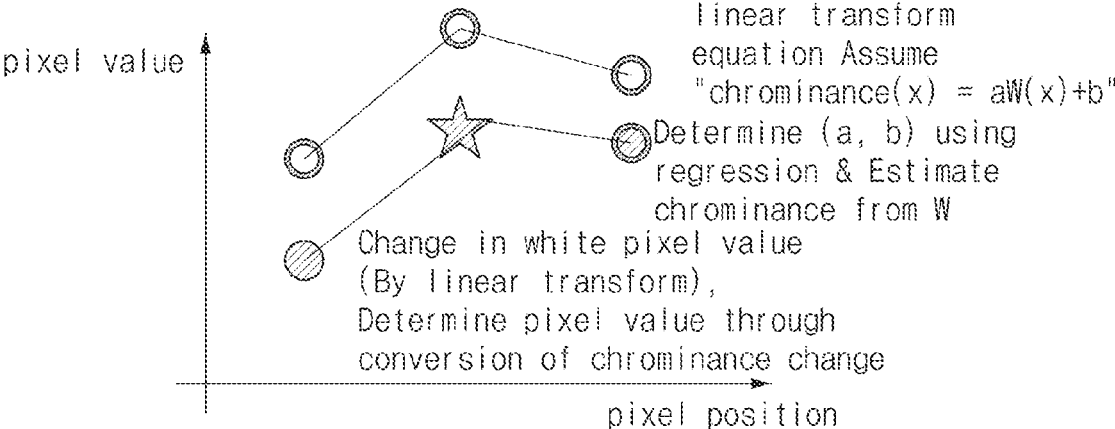

FIG. 11 is a schematic diagram illustrating an example of the image acquisition circuit 400 shown in FIG. 5 based on some embodiments of the disclosed technology. FIGS. 12A and 12B are graphs illustrating examples of operations of a chrominance signal interpolator shown in FIG. 11 based on some embodiments of the disclosed technology.

Referring to FIG. 11, the image acquisition circuit 400 may include a chrominance synthesizer 401, a white (W) image synthesizer 402, an edge enhancement signal generator 403, and a moiré region determiner 404, a chrominance signal interpolator 405, and an image generator 406.

The chrominance synthesizer 401 may synthesize a chrominance value (B_CD1) received from the element processor 210 and a composite chrominance image (RGB_CD3) received from the synthesizer 310 based on the synthetic image (T) generated by the element processor 210, and may thus generate a composite chrominance image (RGB_CD4). Here, the chrominance value (B_CD1), which is one input of the chrominance synthesizer 401, may be a Bayer image, so that the composite chrominance image (RGB_CD4) may also be a Bayer image.

The white image synthesizer 402 may synthesize a low-noise white image (W_NR1) received from the element processor 210 and a composite white image (W_NR4) received from the synthesizer 310 based on the synthetic image (T) generated by the element processor 210, and may thus generate a composite white image (W_NR5).

For example, the chrominance synthesizer 401 and the white image synthesizer 402 may increase the ratio of a reduced image (e.g., a composite image SI1) in a flat image region or a gradation image region based on the synthetic image (T), may increase the ratio of a non-reduced image (e.g., the processed image PI1) in an image region having edges or thin lines, and may thus synthesize two input images.

The edge enhancement signal generator 403 may perform edge enhancement processing on the white image W1 (corresponding to 112 of FIG. 6) of the image data 40 and the composite white image (W_NR5) received from the white image synthesizer 402. As a result, the white image (W2) obtained by completion of such edge enhancement processing may be output. That is, before the image generator 406 generates the output RGB images, the edge enhancement signal generator 403 performs edge enhancement processing to increase the contrast, thereby making the image texture of the output RGB images clearer.

For example, the edge enhancement signal generator 403 may first extract high-frequency components from the white image (W1) of the original image data 40 in which noise is not reduced, may filter frequencies greater than a preset frequency, and may thus generate texture enhancement components. Then, the edge enhancement signal generator 403 may generate the white image W2 in which edge enhancement processing is completed by adding texture enhancement components to the composite white image (W_NR5) in which noise reduction processing was completed. Also, since the edge enhancement signal generator 403 may perform edge enhancement processing by combining the composite white image (W_NR5) in which noise reduction processing was completed and the original white image (W1) in which noise is not reduced, the sharpness of a region excessively blurred by such noise reduction processing can be increased.

The moiré region determiner 404 may determine the moiré region based on the white image (W1) of the image data 40 and the composite white image (W_NR5) received from the image synthesizer 402, and may thus generate a moiré determination signal (MDS). Here, the term "moiré" may refer to, when a subject having a repeated pattern is photographed, a non-uniform image generated when interference of high-frequency components occurs in a region where the pattern is similar to a spatial frequency of the image sensor. The moiré region determiner 404 may detect the moiré region in the white image (W1) and the composite white image (W_NR5), and may generate a moiré determination signal (MDS) corresponding to whether or not the moiré region is detected.

For example, a region in which a color moiré (false color) occurs may be a region in which a texture having a higher frequency than a Nyquist frequency corresponding to a sampling interval of color pixels exists. Since the number of white pixels is smaller than the number of output pixels, there may be a frequency domain in which the presence or absence of a texture having high frequency components cannot be confirmed. In the embodiment of the disclosed technology, since the white image to be input has the same resolution (i.e., the same number of pixels) as the output image, it is not necessary to interpolate the white image. Therefore, in an embodiment, as can be seen from the white image shown in the drawings, it is possible to determine the presence or absence of a high-frequency texture up to the Nyquist frequency of the output image. That is, in an embodiment, the moiré region determiner 404 may determine whether there is a high frequency component around each pixel of the white image, and may thus determine whether or not a corresponding region is a region in which a color moiré occurs. Here, "high frequency component" may mean having a frequency higher than a predetermined frequency (e.g., the Nyquist frequency described above).

Here, the method for determining the color moiré region by the moiré region determiner 404 may also use a method of calculating the intensity of an amplitude of a high frequency component using a Fourier transform, a Hadamard transform, a high-pass filter, or the like. As another example, a method of adding absolute differential values of pixel values adjacent to each other in a horizontal or vertical direction based on a central pixel and determining the magnitude of the added values may be used. As still another example, a method of comparing absolute differential values of upper and lower pixels from the central pixel with absolute differential values of left and right pixels from the central pixel, and thus calculating an average value of a pair of pixels having smaller values may be used. Then, the calculated average value and the absolute differential value of the pixel value of the central pixel are calculated, and the calculated value is compared with the amount of noise. In this case, if the calculated value is greater than the amount of noise within a corresponding region, this corresponding region may be determined to be a color moiré region. The method for determining the moiré region is not limited thereto, and other methods may also be used as needed.

The chrominance signal interpolator 405 may interpolate the composite white image (W_NR5) and the composite chrominance image (RGB_CD4) based on the moiré determination signal (MDS) and the synthetic image (T), and may output an interpolated RGB image (IRGB). Here, as an input signal for the chrominance signal interpolator 405, a composite white image (W_NR5) having the same resolution as the output image and not requiring interpolation may be used. The chrominance signal interpolator 405 may interpolate the color difference between the red image (or green image or blue image) and the white image based on the composite white image (W_NR5), and may generate an interpolated RGB image (IRGB).

For example, referring to FIG. 12A, when the corresponding region is not the color moiré region based on the moiré determination signal (MDS), the chrominance signal interpolator 405 may determine the direction using the white image, and may interpolate red (R) chrominance, green (G) chrominance, and blue (B) chrominance based on the determined direction. In some embodiments, interpolation of the R chrominance, interpolation of the G chrominance, and interpolation of the B chrominance may be linear interpolation, but the scope of the disclosed technology is not limited thereto.

On the other hand, referring to FIG. 12B, when the corresponding region is determined to be a color moiré region, the chrominance signal interpolator 405 may interpolate a chrominance in the color moiré region based on the moiré determination signal (MDS). In some embodiments, interpolation of such chrominance may be performed using filtering considering edge information, such as guided filtering. That is, it can be assumed that the texture obtained by linearly transforming the white image W(x) using arbitrary coefficients (a, b) is each chrominance image (denoted by 'chrominance (x)'). The coefficients (a, b) of such linear transform can be calculated by linear regression to calculate the pixel value of the central pixel, such that interpolation can be performed. For example, in order to calculate such linear regression, a pixel value of a white image of a plurality of neighboring pixels located around the central pixel and a pixel value of a chrominance image may be used. A chrominance image (denoted by 'chrominance (x)') can be determined using the coefficients (a, b) calculated by linear regression.

Also, the image generator 406 may generate an output RGB image based on the interpolated RGB image (IRGB) and the white image (W2) in which edge enhancement processing is completed. For example, the image generator 406 may generate an output RGB image by multiplying the interpolated RGB image (IRGB) by pixel values of the white image (W2) in which edge enhancement processing is completed. Accordingly, in an embodiment, the RGB image generator 406 may generate an output RGB image in which color distortion is reduced and noise is reduced.

As is apparent from the above description, the image signal processor based on some embodiments of the disclosed technology can acquire an image with higher sharpness and less noise, and can thus improve the quality of image signals.

The embodiments of the disclosed technology may provide a variety of effects capable of being directly or indirectly recognized through the above-mentioned patent document.

Although a number of illustrative embodiments have been described, it should be understood that modifications and enhancements to the disclosed embodiments and other embodiments can be devised based on what is described and/or illustrated in this patent document.

What is claimed is:

1. An image signal processor comprising:
   a resolution converting circuit configured to generate at least two images based on image data including color pixel values and white pixel values;
   an element processor configured to extract texture information, and to generate at least two processed images based on the extracted texture information;
   a synthesizer configured to generate a composite chrominance image and a composite white image by synthesizing the at least two processed images; and
   an image acquisition circuit configured to generate an output image based on the image data, the composite chrominance image, and the composite white image,
   wherein the element processor further includes:
   a first texture determiner configured to determine a texture based on a first converted color pixel values and a first converted white pixel values included in each of the at least two images, and to output texture information and a synthetic image obtained by conversion of the texture information.

2. The image signal processor according to claim 1, wherein the resolution converting circuit includes:
   a first resolution converting circuit configured to convert a resolution of the image data to generate a first image having a smaller size than the image data; and
   a second resolution converting circuit configured to convert a resolution of the first image to generate a second image having a smaller size than the image data.

3. The image signal processor according to claim 2, wherein the first resolution converting circuit includes:
   a Bayer resolution converting circuit configured to convert a resolution of a Bayer image of the image data, and to output a first red image, a first green image, and a first blue image, each of which has a smaller size than the Bayer image; and
   a white resolution converting circuit configured to convert a resolution of a white image of the image data, and to output a first white image having a smaller size than the white image.

4. The image signal processor according to claim 3, wherein:
   the Bayer resolution converting circuit performs interpolation such that a center of gravity of a central pixel of each of the first red image, the first green image, and the first blue image coincides with a center of gravity of a central pixel of the first white image.

5. The image signal processor according to claim 3, wherein the second resolution converter includes:
   a red resolution converting circuit configured to convert a resolution of the first red image to output a second red image having a smaller size than the first red image;
   a green resolution converting circuit configured to convert a resolution of the first green image to output a second green image having a smaller size than the first green image;
   a blue resolution converting circuit configured to convert a resolution of the first blue image to output a second blue image having a smaller size than the first blue image; and a white resolution converting circuit configured to convert a resolution of the first white image to output a second white image having a smaller size than the first white image.

6. The image signal processor according to claim 2, wherein the element processor includes:

a first element processor configured to extract texture information using the image data, and to generate a first processed image based on the extracted texture information;

a second element processor configured to generate a second processed image corresponding to the first image by using first converted color pixel values and first converted white pixel values included in the first image, wherein the second element processor further includes the first texture determiner; and a third element processor configured to generate a third processed image corresponding to the second image by using second converted color pixel values and second converted white pixel values included in the second image.

7. The image signal processor according to claim 6, wherein the first element processor includes:

a second texture determining circuit configured to determine the texture based on a Bayer image and a white image of the image data, and to output texture information and a composite image obtained through conversion of the texture information;

a first noise reduction circuit configured to perform noise reduction processing on pixel values of the white image based on the texture information, and to generate a third white image with less noise; and a first chrominance calculating circuit configured to calculate a first chrominance value between the Bayer image and the white image based on the texture information.

8. The image signal processor according to claim 7, wherein the texture information includes:

at least one of information about whether the Bayer image and the white image belong to a flat image region or a gradation image region, information about whether edges or thin lines are present, and information about directivity information of the thin lines.

9. The image signal processor according to claim 7, wherein the first noise reduction circuit is configured to:

perform, based on the texture information, different noise reduction processes not only in some regions in which the texture is equal to or higher than a first level, but also in other regions in which the texture is less than the first level.

10. The image signal processor according to claim 6, wherein the second element processor further includes:

a second noise reduction circuit configured to perform noise reduction processing on the first converted white pixel values based on the texture information, and to generate a fourth white image with less noise; and a second chrominance calculating circuit configured to calculate a second chrominance value between the first converted color pixel values and the first converted white pixel values based on the texture information.

11. The image signal processor according to claim 10, wherein the synthesizer includes:

a first synthesizer configured to generate a first composite image by synthesizing a second composite image and the second processed image from among the at least two processed images; and a second synthesizer configured to generate the second composite image by synthesizing a third composite image and the third processed image from among the at least two processed images.

12. The image signal processor according to claim 11, wherein the first synthesizer includes:

a first chrominance synthesizer configured to generate a first composite chrominance image by synthesizing the second chrominance value and a third chrominance value of the second image based on the synthetic image; and a first white image synthesizer configured to generate a first composite white image by synthesizing the fourth white image and a fifth white image included in the second composite image based on the synthetic image.

13. The image signal processor according to claim 12, wherein the first synthesizer is configured such that:

a ratio of the second chrominance value to the third chrominance value is adjusted and synthesized, and a ratio of the fourth white image to the fifth white image is adjusted and synthesized.

14. The image signal processor according to claim 12, wherein the image acquisition circuit includes:

a second chrominance synthesizer configured to generate a second composite chrominance image by synthesizing a first chrominance value and the first composite chrominance image based on the synthetic image;

a second white image synthesizer configured to generate a second composite white image by synthesizing a third white image received from the first element processor and the first composite white image based on the synthetic image;

an edge enhancement signal generator configured to generate a sixth white image in which edge enhancement processing is completed by combining a white image of the image data and the second composite white image;

a moiré region determining circuit configured to determine a moiré region based on the white image of the image data and the second composite white image, and to generate a moiré determination signal;

a chrominance signal interpolator configured to output an interpolated red, green, and blue (RGB) image by interpolating the second composite chrominance image and the second composite white image based on the moiré determination signal and the synthetic image; and an image generator configured to generate an output RGB image based on the sixth white image and the interpolated RGB image.

15. The image signal processor according to claim 14, wherein the image acquisition circuit is configured such that:

a ratio of the first chrominance value to the first composite chrominance image is adjusted and synthesized, and a ratio of the third white image to the first composite white image is adjusted and synthesized.

16. The image signal processor according to claim 14, wherein the edge enhancement signal generator is configured to:

generate a texture enhancement component by extracting a high frequency component from the white image, and generate the sixth white image by adding the generated texture enhancement component to the second composite white image.

17. The image signal processor according to claim 14, wherein the moiré region determining circuit is configured to:

determine whether there is a high-frequency component around each pixel of the white image and the second composite white image, and determine whether a corresponding region is a region in which a color moiré occurs.

18. The image signal processor according to claim 14, wherein the chrominance signal interpolator is configured to:

when a corresponding region is determined to be a color moiré region based on the moiré determination signal, perform interpolation using filtering processing; and when a corresponding region is determined to be a region other than the color moiré region, determine directivity using the second composite white image, and perform interpolation of red (R) chrominance, green (G) chrominance, and blue (B) chrominance based on the determined directivity.

19. The image signal processor according to claim 14, wherein the image generator is configured to:

generate the output RGB image by multiplying the interpolated RGB image by a pixel value of the sixth white image.

20. The image signal processor according to claim 1, further comprising:

a binning circuit configured to generate the color pixel values and the white pixel values by binning color pixels and white pixels in the image data.

* * * * *